US010239768B2

(12) United States Patent
Bozak

(10) Patent No.: US 10,239,768 B2
(45) Date of Patent: Mar. 26, 2019

(54) METHOD AND SYSTEM FOR DE-OILING A FEED OF OIL AND WATER

(71) Applicant: RJ Oil Sands Inc., New Westminster (CA)

(72) Inventor: Wade R. Bozak, Edmonton (CA)

(73) Assignee: 1501367 Alberta Ltd., Edmonton (CA)

(*) Notice: Subject to any disclaimer, the term of this patent is extended or adjusted under 35 U.S.C. 154(b) by 131 days.

(21) Appl. No.: 14/341,652

(22) Filed: Jul. 25, 2014

(65) Prior Publication Data

US 2015/0041402 A1 Feb. 12, 2015

Related U.S. Application Data

(60) Provisional application No. 61/862,886, filed on Aug. 6, 2013.

(51) Int. Cl.
*C02F 1/24* (2006.01)
*B01D 17/02* (2006.01)
*C02F 1/40* (2006.01)
*C02F 101/32* (2006.01)

(52) U.S. Cl.
CPC ............ *C02F 1/24* (2013.01); *B01D 17/0205* (2013.01); *C02F 1/40* (2013.01); *C02F 2101/32* (2013.01); *C02F 2203/008* (2013.01); *C02F 2301/066* (2013.01)

(58) Field of Classification Search
None
See application file for complete search history.

(56) References Cited

U.S. PATENT DOCUMENTS

| 3,318,448 A | 5/1967 | Fryer |
| 3,526,585 A | 9/1970 | Camp |

(Continued)

FOREIGN PATENT DOCUMENTS

| CA | 2 531 007 A1 | 6/2007 |
| DE | 43 12 725 A | 3/1994 |

(Continued)

OTHER PUBLICATIONS

"The Karl Clark Process," © 2002 Heritage Community Foundation, <http://www.collectionscanada.gc.ca/eppp-archive/100/205/301/ic/cdc/www.abheritage.ca/abresources/innovation/research_oilsands_clark.html> [retrieved Jul. 3, 2013], 2 pages.

(Continued)

*Primary Examiner* — Thomas M Lithgow
(74) *Attorney, Agent, or Firm* — Christensen O'Connor Johnson Kindness, PLLC

(57) ABSTRACT

A method and system for de-oiling a feed comprising oil and water. The feed has an input temperature above the boiling point of water and an input pressure sufficient to maintain the water in a liquid state. In at least one embodiment, the method comprises pumping the feed with a motive pump through a phase separator having a restriction to effect a phase separation of oil and water in the feed and produce an agitated mixture, supplying the agitated mixture from the phase separator into a pressure vessel operating at a pressure sufficient to maintain in a liquid state water that is at a temperature above the boiling point of water, removing an oil phase from the pressure vessel, and removing a water phase from the pressure vessel.

17 Claims, 4 Drawing Sheets

(56) References Cited

U.S. PATENT DOCUMENTS

| | | | |
|---|---|---|---|
| 3,623,608 A * | 11/1971 | Waterman | B01D 17/0205 210/101 |
| 3,784,468 A * | 1/1974 | Garcia | B01D 17/0205 210/202 |
| 4,545,892 A | 10/1985 | Cymbalisty | |
| 4,783,268 A | 11/1988 | Leung | |
| 4,913,814 A | 4/1990 | Singh | |
| 4,971,703 A * | 11/1990 | Sealock, Jr. | B01D 17/00 208/13 |
| 5,110,457 A | 5/1992 | Krawl | |
| 5,460,270 A | 10/1995 | Chan | |
| 5,484,534 A * | 1/1996 | Edmondson | B01D 17/0205 210/195.1 |
| 5,516,434 A * | 5/1996 | Cairo, Jr. | B01D 24/14 210/108 |
| 5,811,013 A | 9/1998 | Ito | |
| 5,873,980 A * | 2/1999 | Young | B01D 5/0063 196/98 |
| 5,879,541 A | 3/1999 | Parkinson | |
| 5,935,445 A | 8/1999 | Febres | |
| 6,004,455 A | 12/1999 | Rendall | |
| 6,527,960 B1 | 3/2003 | Bacon | |
| 6,821,060 B2 | 11/2004 | McTurk | |
| 7,416,671 B2 | 8/2008 | Bozak | |
| 8,834,724 B1 * | 9/2014 | Richerand | C02F 1/24 210/201 |
| 9,169,717 B2 * | 10/2015 | Levey | E21B 37/06 |
| 9,844,782 B2 * | 12/2017 | Emburgh | B01L 7/00 |
| 2011/0272362 A1 * | 11/2011 | Sikes | C02F 1/56 210/705 |
| 2012/0145642 A1 | 6/2012 | Bozak | |
| 2012/0325744 A1 * | 12/2012 | Polizzotti | C02F 9/00 210/638 |
| 2013/0284677 A1 * | 10/2013 | Snydmiller | C02F 9/00 210/703 |

FOREIGN PATENT DOCUMENTS

| | | | |
|---|---|---|---|
| WO | 2011/082498 A1 | | 7/2011 |
| WO | 2012/000116 A1 | | 1/2012 |
| WO | WO2012/000116 | * | 1/2012 |
| WO | 2012/116442 A1 | | 9/2012 |

OTHER PUBLICATIONS

"MKI Slop Oil Plant: Capacity Range 5 $M^3$ to 15 $M^3$/Hr," G-force Consulting Engineers, Alphen aan de Rijn, Netherlands, n.d.,<http://www.g-forcebv.com>, at least as early as Sep. 9, 2015, 2 pages.

"Slop Oil Recovery," GEA Mechanical Equipment GmbH, Oelde, Germany, <http://novacro.com.ar/archivos/241_1380401851_slop-oil-recovery-Ol-12-07-0009.pdf>, at least as early as Sep. 9, 2015, 6-page brochure.

\* cited by examiner

METHOD AND SYSTEM FOR DE-OILING A FEED OF OIL AND WATER

CROSS-REFERENCE TO RELATED APPLICATIONS

This application claims the benefit under 35 USC 119(e) of U.S. provisional application Ser. No. 61/862,886 filed Aug. 6, 2013.

BACKGROUND

Many fluid systems in the oil industry store or produce a fluid containing oil and water at temperatures over one hundred degrees Celsius and under pressure to prevent boiling. Before de-oiling, such feeds are cooled with a heat exchanger and cooling circuit prior to treatment in one or more flotation cells.

SUMMARY

A method is disclosed of de-oiling a feed comprising oil and water, the feed having an input temperature above the boiling point of water and an input pressure sufficient to maintain the water in a liquid state, the method comprising: pumping the feed with a motive pump through a phase separator having a restriction to effect a phase separation of oil and water in the feed and produce an agitated mixture; supplying the agitated mixture from the phase separator into a pressure vessel operating at a pressure sufficient to maintain in a liquid state water that is at a temperature above the boiling point of water; removing an oil phase from the pressure vessel; and removing a water phase from the pressure vessel. A system for carrying out the method.

A system is also disclosed for de-oiling a feed comprising oil and water, the system comprising: an input point connected to receive the feed, the feed having an input temperature above the boiling point of water and an input pressure sufficient to maintain the water in a liquid state; a motive pump connected to pump the feed from the input point through a phase separator having a restriction to effect a phase separation of oil and water in the feed and produce an agitated mixture; a pressure vessel connected to receive the agitated mixture, the pressure vessel having a pressure sufficient to maintain water, which is above the boiling point of water, from the agitated mixture in a liquid state; an oil phase outlet connected to the pressure vessel; and a water phase outlet connected to the pressure vessel.

In various embodiments, there may be included any one or more of the following features: The pressure vessel, motive pump, and phase separator are housed on a mobile platform having an input point connected to the motive pump, and further comprising the initial stages of: transporting the mobile platform to a work site containing the feed; and connecting the feed to the input point. The mobile platform is free of fluid cooling devices between the input point and the pressure vessel. The mobile platform comprises a skid or trailer. The feed comprises slop oil. Supplying the water phase to an amine plant for treatment of sour gas. Supplying a gas blanket at or above 500 kPa to the pressure vessel. Pumping the water phase through a second phase separator having a restriction to effect a phase separation of oil and water in the feed and produce a second agitated mixture; supplying the second agitated mixture from the phase separator into a second pressure vessel operating at a pressure sufficient to maintain in a liquid state water that is at a temperature above the boiling point of water; removing an oil phase from the second pressure vessel; and removing a water phase from the second pressure vessel. The phase separator comprises a mixing chamber downstream of the restriction, and the feed is pumped through the restriction and mixed with a gas in the mixing chamber. Removing from the pressure vessel a sample through a sample line, the sample line being connected to a cooling device. The sample line is connected to a fume hood. The cooling device is a heat exchanger connected to a refrigeration loop. The pressure vessel is a flotation cell. The system is housed on a mobile platform. A gas blanket pressure source is connected to the pressure vessel. A housing contains the motive pump, the pressure vessel, the oil phase outlet and the water phase outlet.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

At many oil field sites, for example at a well site, refinery, or other installation, there are sources of high pressure, high temperature, oily water. Examples include slop oil or fluids produced from a well. Treatment of high temperature high pressure oily water involves the following process. The fluid leaves a pressurized storage vessel or line, and passes through one or more coolers such as a heat exchangers carrying coolant to cool the fluid below the boiling point of water. Cooled fluid is then discharged into a fluid treatment system that operates at or slightly above atmospheric pressure, such system usually incorporating one or more cascading flotation cells, such as induced gas flotation cells.

Often times the water output from de-oiling systems is used in processes that require a hot water input at over one hundred degrees Celsius. In such cases, a heater such as a second heat exchanger must be used to raise the temperature of the output water.

The use of input and output heat exchangers with de-oiling systems creates a bottleneck in the industry that consumes energy and requires additional infrastructure to operate above and beyond the de-oiling equipment. In addition, such heat exchangers are often easily fouled from the passage of oily water feeds.

Figure 1:
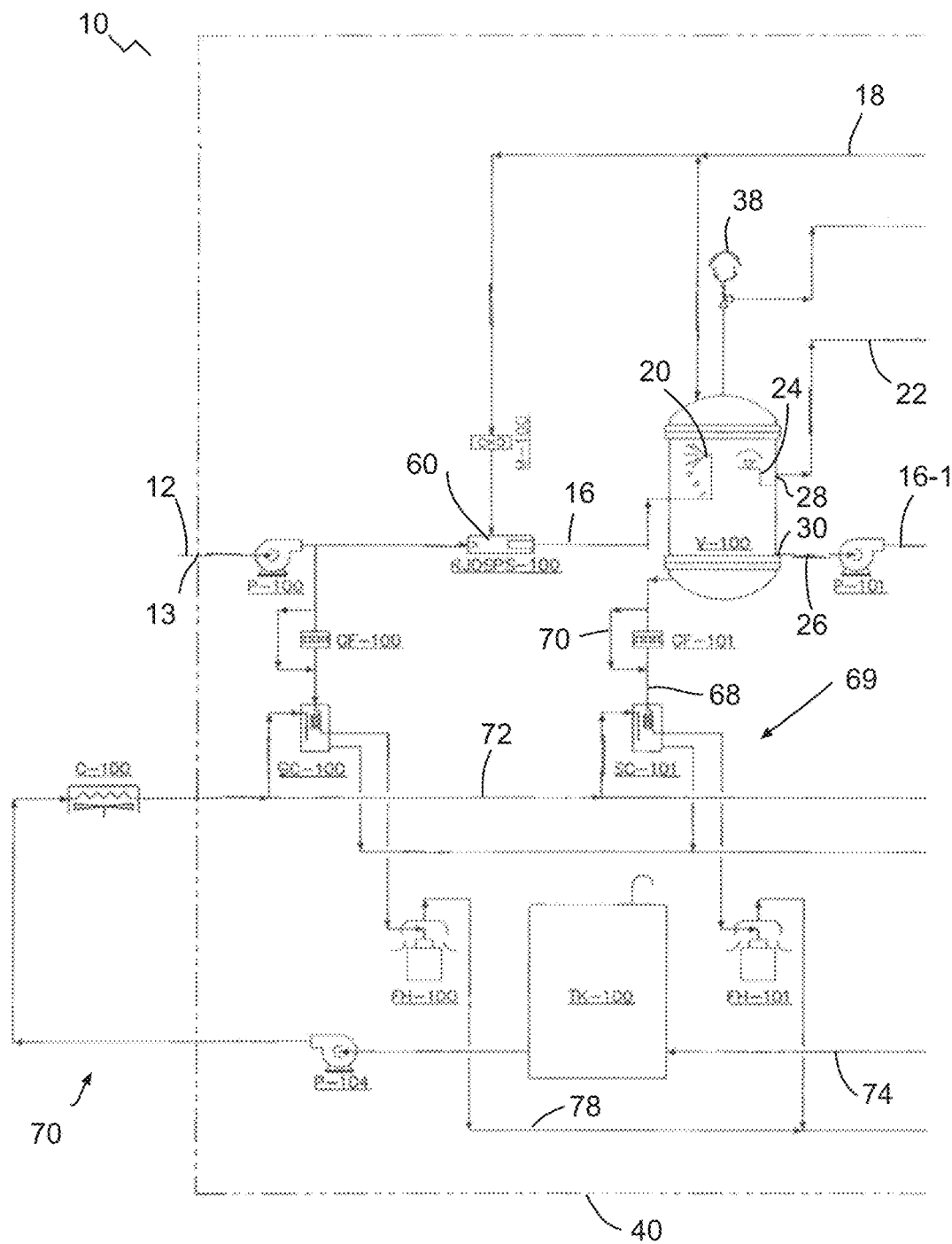
FIGS. 1-3 collectively illustrate a schematic of a system and method for de-oiling a feed of oil and water.
Figure 2:
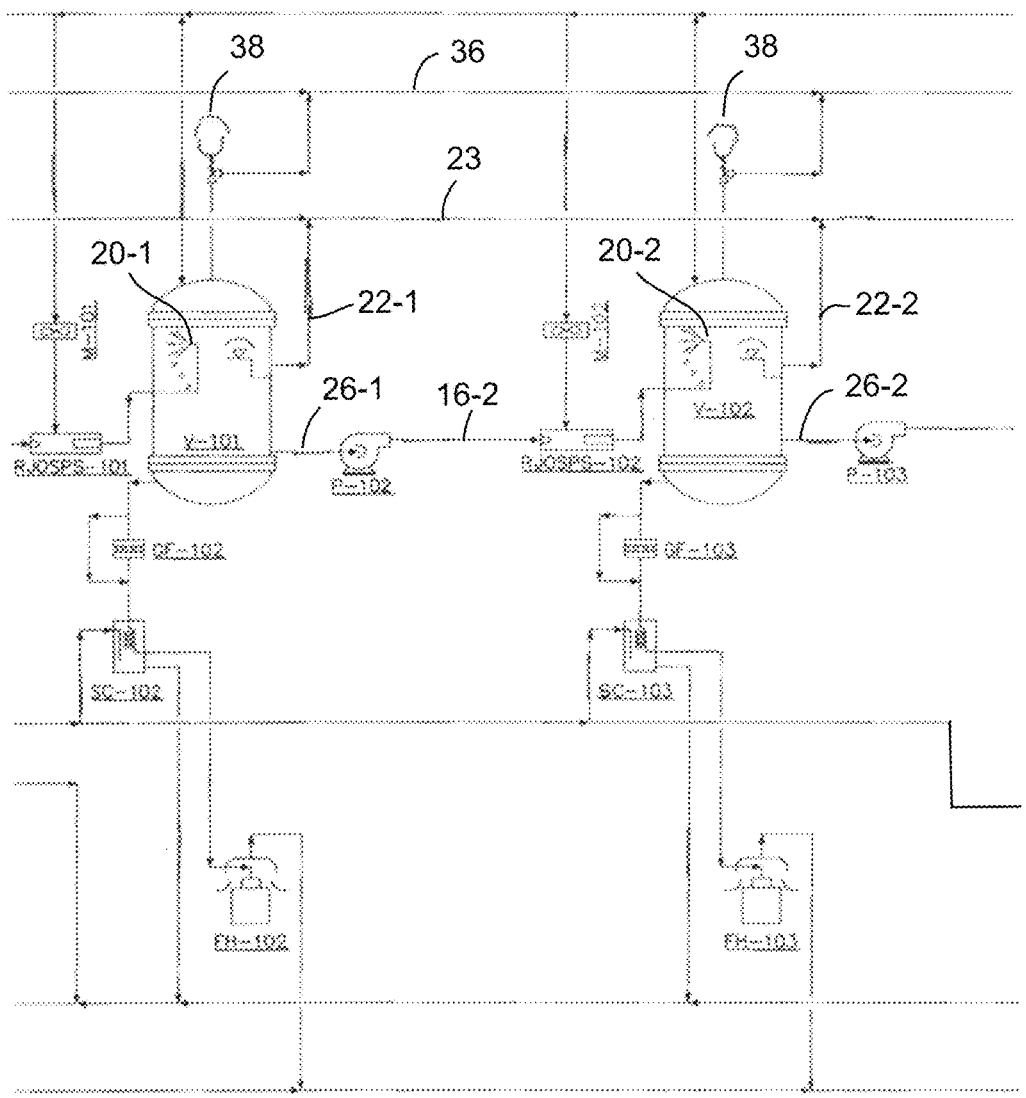
Figure 3:
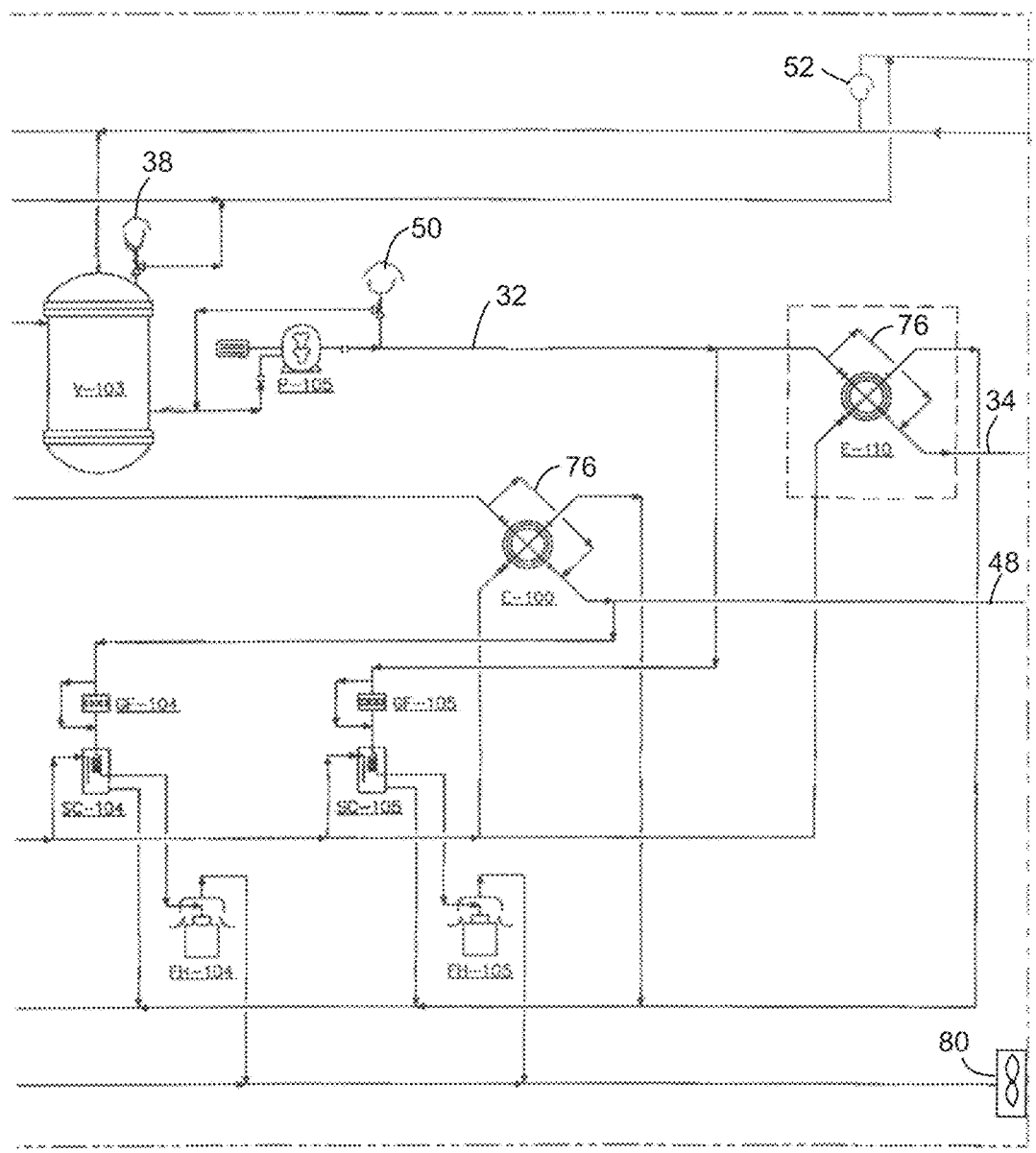
Figure 1A:
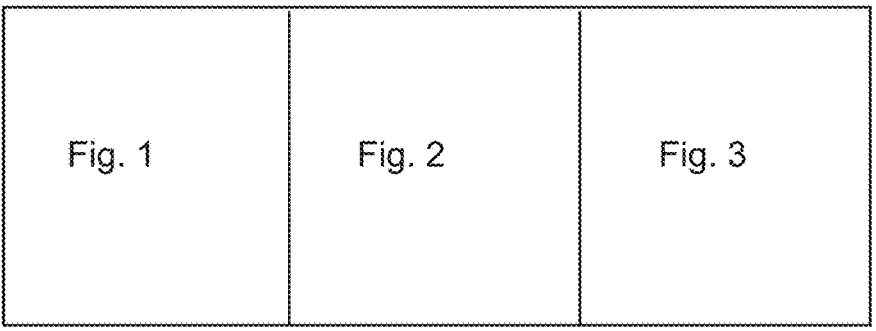
FIG. 1A is a view illustrating the linkage between the partial views shown in FIGS. 1-3.

Referring to FIGS. 1-3, a method and system 10 of de-oiling a feed 12 is illustrated. Feed 12 comprises oil and water. Feed 12 also has an input temperature above the boiling point of water and an input pressure sufficient to maintain the water in a liquid state.

Feed 12 is pumped with booster or motive pump P-100 through a phase separator RJOSPS-100. The phase separator RJOSPS-100 has a restriction 14 (discussed further below with reference to FIG. 5), and effects a phase separation of oil and water in the feed to produce an agitated mixture outputted into line 16. The agitated mixture is then supplied from the phase separator RJOSPS-100 through line 16 into a pressure vessel V-100, which may be a flotation cell, operating at a pressure sufficient to maintain in a liquid state water that is at a temperature above the boiling point of water. For example, V-100 may be at or above 500 kPa, of which pressure may be supplied by a gas blanket from line 18 (gas blanket pressure source). Line 18 may connect to one or more gas tanks. The gas used in the gas blanket may include natural gas or inert gas such as nitrogen and may be provided over the components of the vessel V-100 during use. Other gases or mixtures of gas may be used. A gas blanket may be set up using piping to all tanks and lines of system 10 as shown to exclude oxygen and maintain a non-explosive atmosphere.

Line 16 may discharge through an inlet 20 such as a diffuser (not shown) at a fluid surface such as an oil fluid surface or a fluid interface between water and oil in the vessel V-100. Such location of inlet 20 permits gentle dispersion of the agitated mixture into the pressure vessel V-100 without vigorous contact with the fluid already in the vessel V-100.

An oil phase is removed via line 22 (oil phase outlet) from the pressure vessel V-100, for example, using an oil removal device such as a weir 24. Vessel V-100 operates as a separator tank where oil is separated from water by floating on top of the water. A water phase is removed via line 26 (water phase outlet) from vessel V-100, from an outlet position 30 lower than the outlet position 28 of line 22.

Fluids from feed 12 may be treated in one or more cascading pressure vessels, for example, vessels V-100, V-101, and V-102. Thus, for example, the water phase from vessel V-100 may be pumped with pump P-101 through a second phase separator RJOSPS-101 and supplied as an agitated mixture view line 16-1 into a second pressure vessel V-101 operating at a pressure sufficient to maintain in a liquid state water that is at a temperature above the boiling point of water. The components of each subsequent stage of fluid separation may function in a similar fashion as the components of the preceding stage. Thus, for example, vessel V-101 operates like vessel V-100 with an oil phase being removed via line 22-1 and a water phase being removed via line 26-1. Similarly, pump P-101 and phase separator RJOSPS-101 may operate in the same fashion as pump P-100 and RJOSPS-100, respectively. The water phase removed via line 26-1 may be further processed, with phase separator RJOSPS-102 and vessel V-102, both of which operate like preceding pump P-100 and phase separator RJOSPS-100, respectively.

Oil removed from one or more of pressure vessels V-100, V-101, and V-102 may be further processed, for example, by combining into a single line 23 that feeds an oil emulsion tank V-103, which may also be a pressure vessel operating under pressure. Oil emulsion tank V-103 may have a water drain (not shown), and may output processed oil through one or more transfer pumps P-105 (such as a lobe pump) on a line 32 to an outlet 34 of system 10. A heat exchanger such as a spiral exchanger E-110 may be used to cool the oil in line 32 if desired.

In general, all the pressure vessels described in this document may operate at a pressure sufficient to maintain in a liquid state water that is at a temperature above the boiling point of water. By keeping the pressure vessels at such pressures, the flashing of hot water into steam from processed fluids is reduced or eliminated, and there is no need to reduce the temperature of feed 12 fluids prior to processing.

Figure 4:
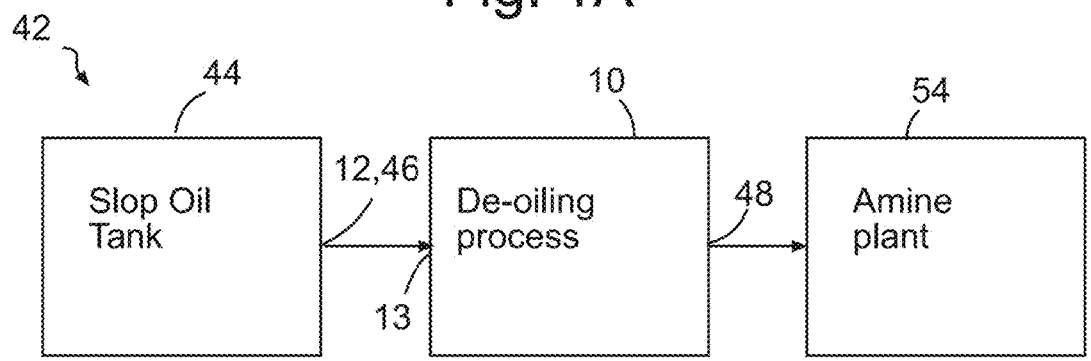
FIG. 4 is a schematic of a system of de-oiling slop oil for use in an amine plant.

One or more components of system 10 may be housed on a mobile platform 40, such as at least the pressure vessel V-100, motive pump P-100, and phase separator RJOSPS-100. In a further example, all the components illustrated in FIGS. 1-3 are housed on platform 40, which may be a skid or trailer for example. In some cases, the dashed lines 40 may delineate a protective housing located on platform 40. Platform 40 has an input point 13 connected to the motive pump P-100. Referring to FIG. 4, the platform 40 may be transported, for example by trailer or rail, to a work site 42 containing the feed 12, for example in the form of an outlet from a feed source such as a slop oil tank 44. Once present at work site 42, feed 12 is connected to the input point 13 of system 10. Referring to FIGS. 1-3, the mobile platform 40 may be free of fluid cooling devices at least between the input point 13 the pressure vessel V-100. In some cases, no fluid cooling devices may be present between input point 13 and de-oiled water output 48 or oil emulsion output 34, though the examples shown incorporate optional output heat exchangers E-100 and E-110 if the client desires a cool output feed. A system 10 of the sort illustrated may be brought to a work site 42, plugged in to a hot feed 12, and used to process fluids without consuming additional resources to cool and heat fluids.

Fluid processing of the sort described in this document may be characterized as thermodynamically passive, with no additional heat being supplied to fluids during processing for the purpose of maintaining the water in such fluids above an ambient boiling temperature of water. A passive system permits the hot water to gradually cool as it is processed within system 10, though the resulting output stream 48 may likely still be above ambient boiling temperature. Ambient boiling temperature is region and elevation specific and is understood to mean the temperature at which water would boil if at ambient pressure.

One or more or all of the pressure vessels may connect to a vapor takeoff line 36 for removal of volatile hydrocarbons and other low-boiling liquids from the fluids. Line 36 may supply such take-off fluids to be further processed or disposed for example via a flare header. Pressure safety valves 38 may be present on all vessels V-100, V-101, V-102, and V-103. Pressure safety valves such as valves 50 and 52 may be used in other parts of system 10 as desired.

Referring to FIG. 4, as discussed above the feed 12 may comprise slop oil, for example, in a tank 44. Slop oil is the collective term for mixtures of oil, chemicals and water derived from a wide variety of sources in refineries or oil fields. Slop oil may be formed when tank wagons and oil tanks are cleaned and during maintenance work or in unforeseen oil accidents. Slop oil may be at a temperature above the ambient boiling temperature of water, but in a pressurized liquid state.

The water phase remove from one or more of vessels V-100, V-101, or V-102 (for example from outlet 48) may be supplied to a downstream system that requires a hot water feed. One such system is an amine plant 54 for treatment of sour gas. Amine plants may be positioned at well sites in order to safely process sour gas after extraction from a well. Prior to use, output water may be treated after system 10, for example, by resin treating to remove for minerals, silica, and dissolved salts. Output water may also be used in other applications such as use as a boiler feed for steam production in a steam assisted gravity drainage operation. Output water may also be used in refinery gas and oily glycol applications.

Referring to FIGS. 1-3, samples may be removed from any one or more of pressure vessels V-100, V-101, V-102, V-103, and other points of the system 10 such as lines 12, 34 and 48 as shown. Samples may be analyzed to monitor and adjust system operation. For example, referring to V-100, a sample may be removed through a sample line 68 that makes up part of a sample removal system 69. A filter such as a glass filter GF-101 may be used or bypassed via line 70 to remove solids. An air supply line 78 may supply fume hood FH-10 with supply air, which may pass through an induced draft fan 80.

The sample line 68 may be connected to a cooling device such as a heat exchanger SC-101 connected to circulate coolant. Cooling the samples allows the samples to be discharged into an analysis unit like a fume food FH-100 at ambient pressure. The coolant may be circulated from a refrigeration circulation loop or system 70, which may circulate coolant such as glycol. System 70 may have a coolant supply line 72, a compressor or air cooler C-100, a return line 74, a glycol expansion tank TK-100, and a pump P-104 such as a centrifugal pump. Coolant from supply line 74 may supply one or more or all heat exchangers in the system 10, including output fluid cooling heat exchangers E-100 and E-110, which each may have a bypass 76.

Figure 5:
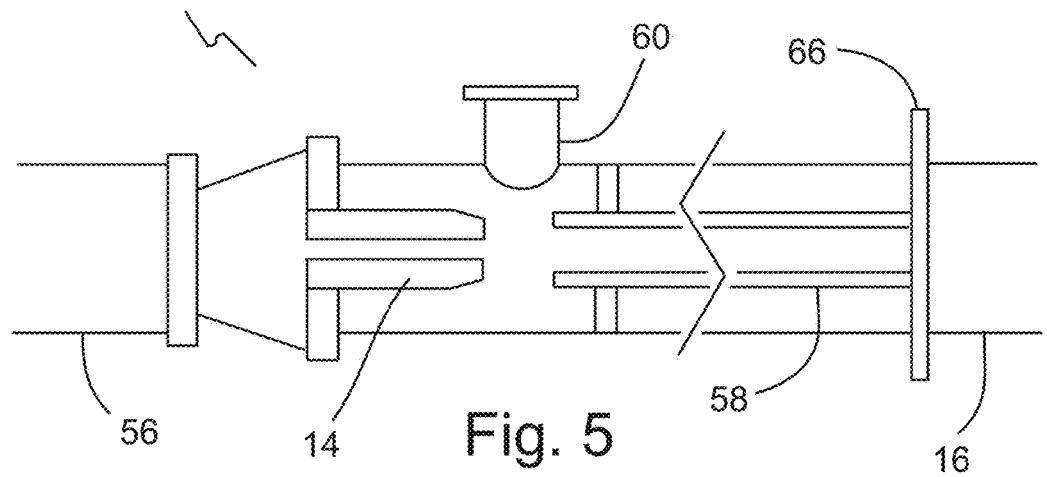
FIG. 5 is a side elevation section view of a phase separator.

Referring to FIG. 5, each phase separator, for example RJOSPS-100, may comprise a conduit 56, a mixing chamber 58, and a port 60. Pump P-100 (FIG. 1) may be provided as part of the phase separator RJOSPS-100. A restriction 14 in the conduit 56 may form a nozzle through which feed 12 flows when the pump P-100 is operated. The conduit 56 may have a mixing chamber 58 downstream of the restriction 14 and a port 60 for admission of gas, for example, from line 18 through turbine flow meter unit M-100 (FIG. 1) into the mixing chamber 58 for example, in an initial portion of the mixing chamber 58, to cause the feed to foam. By mixing gas with the feed 12 in a turbulent manner, the feed 12 may be foamed, which facilitates removal of the oil phase from the separator V-100. Induction of gas may produce pico bubbles in the stream that attach to each droplet of oil to remove the oil from the water or solid phases.

In the example shown, the mixing chamber 58 may terminate downstream at a transition 66 in the conduit 56 to a larger diameter portion 16 of the conduit 56. The mixing chamber 58 may have a length to internal diameter ratio of at least 20:1 or 40:1, preferably in the range 50:1 to 60:1. The mixing chamber 58 may have constant internal diameter along the length of the mixing chamber 58. When the mixing chamber 58 does not have constant internal diameter, the internal diameter of the mixing chamber 58, for the purpose of calculating the length to internal diameter ratio, may be the mean internal diameter. The internal diameter of the mixing chamber 58 may be selected so that the fluid exiting the restriction 14 undergoes turbulence and collision with all parts of the internal wall of the mixing chamber 58. The mixing chamber 58 may need only begin after the fluid exiting the restriction 14 has expanded sufficiently to contact the walls of the mixing chamber 58.

Although the phase separator RJOSPS-100 may not pump anything other than air from the port 60 for mixing with feed 12, RJOSPS-100 may have the general design of a jet pump in terms of the relationship of the size of the mixing chamber to the restriction. The port 60 may be located downstream of the restriction 14 and before the mixing chamber 58. The conduit immediately downstream of the restriction 14 should have a diameter sufficient to accommodate the jet exiting the restriction 14. The mixing chamber 58 may have an internal diameter that is less than the internal diameter of the conduit 56 (before the restriction 14) and greater than the diameter of the restriction 14. For a 12 inch internal diameter mixing chamber 58, the mixing chamber 58 may be 40 feet long. For treatment of tailings, the diameter of the restriction 14 may be selected to provide a pressure in the conduit 56 before the restriction 14 of 75 psi to 150 psi. The conduit 16 after the transition 66 may have an internal diameter equal to the internal diameter of the mixing chamber 58.

The port 60 preferably comprises a valve, which may be controlled manually or automatically such as by controller (not shown). When the port 60 is not open, a vacuum created in the conduit 56 downstream of the pump P-100 may cause vibration within the pipe and poor separation of the fluid components. When the port 60 is opened sufficiently for the vibration to stop, the fluid components may be agitated and a phase separation may occur within the fluid so that oil may be stripped from solids. Gas, for example, air introduced through the port 60 may become entrained with the fluid components and tends to adhere to oil in the fluid. Thus, the phase separator agitates the fluid removed from the flotation cell in the presence of a gas to cause the fluid to foam.

The discharge from line 16 may pass into a pressure vessel V-100 that is not a flotation cell, for example, a centrifuge, hydro-cyclone or another fluid treatment apparatus. Any number of additional such secondary separation apparatus may be used as necessary to effect an adequate phase separation.

The feed 12 having components to be treated may comprise solids such as tailings from a tailings pond, such as a tailings pond at a heavy oil mining facility. The operation of one or more of pumps, for example, P-100 and P-101 respectively preceding and following a pressure vessel V-100 may be operated to maintain the working fluid level in the pressure vessel V-100 within a predetermined range independent of variations in the oil concentration of the feed.

A slightly wet solid phase may be drained from the base of one or more of pressure vessels V-100, V-101 and V-102. The wet solids may be allowed to dry or dried in various ways, such as with the addition of heat, but may also be allowed to drain. Once dried, the solids may be returned to a reclaimed mine site or subject to further processing, for example to extract minerals from the solids.

To avoid redundancy in the description and drawings, reference elements or accompanying description has not been explicitly added for certain repeated components. For example, line 16-2 is not discussed but is understood to function in a fashion similar to 16-1 and 16. As well, the lines and components of all but one of the sample removal systems 69 are delineated in detail in the description and drawings, yet it is understood that the other sample removal systems may function in a fashion similar to the description sample removal system 69 (shown in FIG. 1).

Other components not discussed in detail may be incorporated. For example, in one case feed 12 is filtered with a basket strainer prior to supply to pump P-100. Pumps may be suitable pumps such as centrifugal pumps. Coolant from cooling system 70 may be used to cool pump seals on the motive pumps such as P-100, using for example a shell and tube exchanger connected to line 72. Various valves, bypasses, and piping may be incorporated. Heat exchangers include various types of heat exchangers beyond merely the examples given above. One or more controllers may be used to operate part or all of system 10.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A system for de-oiling a feed comprising oil and water, the system comprising:
   an input point connected to receive the feed, the feed having an input temperature above the boiling point of water and an input pressure sufficient to maintain the water in a liquid state;
   a motive pump connected to pump the feed from the input point through a phase separator having a restriction and a mixing chamber downstream of the restriction, to mix the feed with a gas in the mixing chamber to effect a phase separation of oil and water in the feed and produce an agitated mixture;
   a pressure vessel connected to receive the agitated mixture through a line connecting the motive pump to the pressure vessel through the phase separator, the pressure vessel having a pressure sufficient to maintain water, which is above the boiling point of water, from the agitated mixture in a liquid state;
   an oil phase outlet connected to the pressure vessel; and
   a water phase outlet connected to the pressure vessel.

2. The system of claim 1 housed on a mobile platform.

3. The system of claim 2 in which the mobile platform is free of fluid cooling devices between the input point and the pressure vessel.

4. The system of claim 2 in which the mobile platform comprises a skid or trailer.

5. The system of claim 1 further comprising a gas blanket pressure source connected to the pressure vessel.

6. The system of claim 1 further comprising a housing containing the motive pump, the pressure vessel, the oil phase outlet, and the water phase outlet.

7. The system of claim 1 further comprising one or more pressure vessels connected by lines containing pumps.

8. The system of claim 1 further comprising a sample removal system connected to one or more of (A) the input point, (B) the line connecting the motive pump to the pressure vessel through the phase separator, (C) the pressure vessel, and (D) the water phase outlet.

9. The system of claim 8 further comprising one or more pressure vessels connected by lines containing pumps and in which the sample removal system is connected to one or more of the pressure vessels and the lines connecting the pressure vessels.

10. The system of claim 8 in which the sample removal system further comprises a filter.

11. The system of claim 8 in which the sample removal system further comprises a fume hood.

12. The system of claim 11 further comprising an air supply line connected to the fume hood.

13. The system of claim 8 in which the sample removal system further comprises a cooling device.

14. The system of claim 13 in which the cooling device is a heat exchanger.

15. The system of claim 14 in which the heat exchanger circulates coolant from a refrigeration circulation system.

16. The system of claim 15 in which the coolant is glycol.

17. The system of claim 15 in which the refrigeration circulation system comprises a coolant supply line, a compressor, a return line, a coolant expansion tank and a pump.

* * * * *